March 3, 1959
D. L. BIRX
2,876,356
SIGNAL SEEK TUNER
Filed April 28, 1954
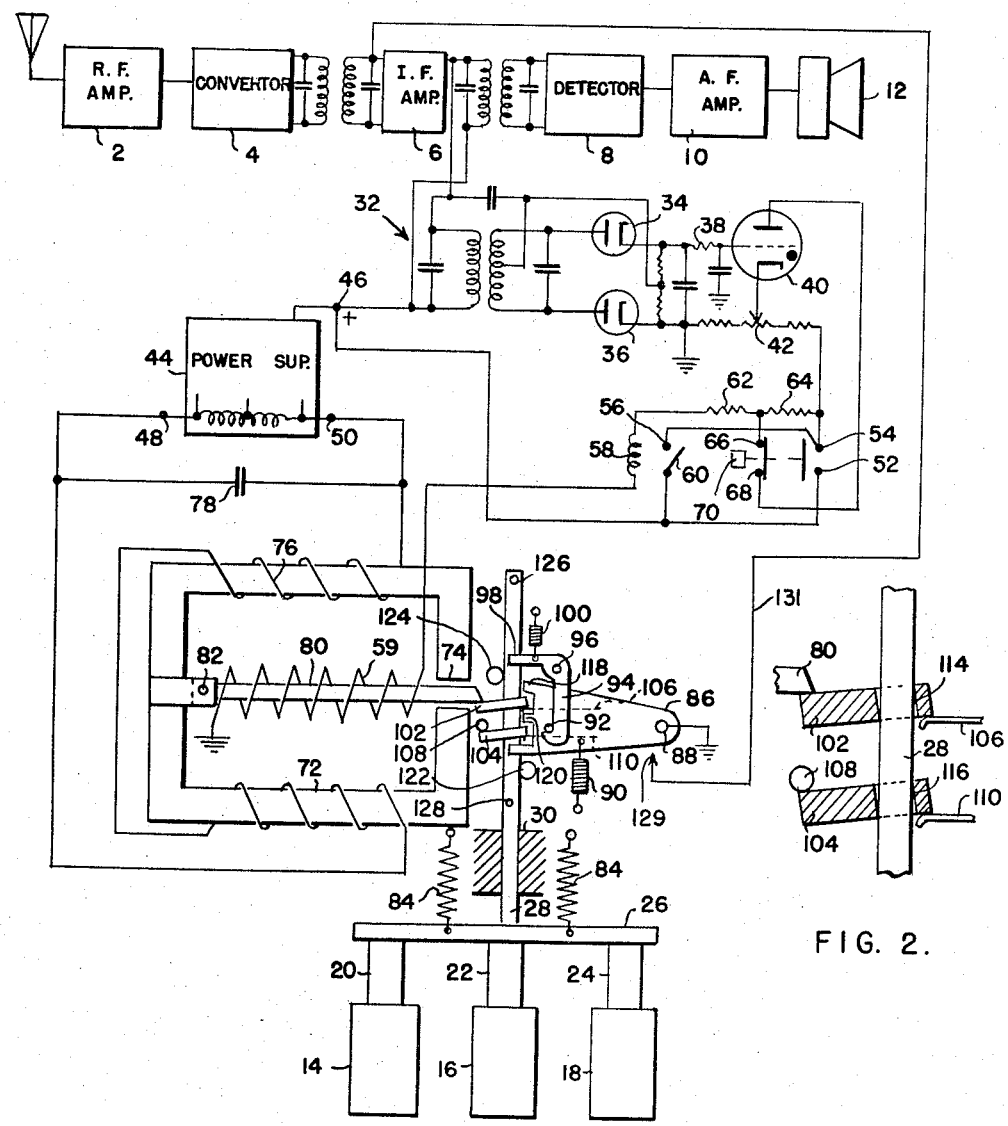
FIG. 2.
FIG. 1.
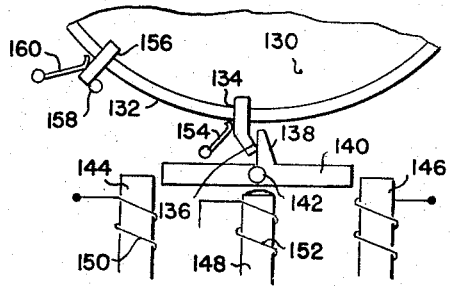
FIG. 3.
*INVENTOR.*
DONALD L. BIRX
BY
ATTORNEYS United States Patent Office 2,876,356
Patented Mar. 3, 1959

2,876,356

SIGNAL SEEK TUNER

Donald L. Birx, Havertown, Pa., assignor to Radio Condenser Company, Camden, N. J., a corporation of New Jersey Application April 28, 1954, Serial No. 426,237

2 Claims. (Cl. 250—40)

This invention relates to signal seek tuners of the type used in radio or television receivers in which changes from reception of one transmitting station to another are effected by the momentary depression or movement of a push button or the like.

Signal seeking tuners of the type which provide variation of positions of tuning elements upon initiation by signal seeking buttons, or the like, usually involve rotary motor drives, the motors being driven from D. C. batteries which, in the usual automotive use of such tuners, would be the ordinary car batteries. Such motors drive the tuning elements, usually at the present time tuning inductor cores, through connections including reduction gearing. Since it is desired to stop the tuning operation precisely when tuning is effected to an incoming signal, it has generally been necessary not only to provide a clutch for disconnecting the motor but also a brake for stopping the parts of the connections directly associated with the tuning elements. Many variations of the foregoing have been proposed but in common they have the disadvantages of both mechanical and electrical complexity and, in particular, the necessity for utilizing relays for the interruption of drive by the motor and the application of brakes. Most of the complications may be ascribed to the inertia of the driving motor parts and the necessity for eliminating the effects of this inertia in securing sharp tuning.

In the application of J. C. Heselwood, Serial No. 426,222, filed April 28, 1954, there is described and claimed a type of motor which is particularly advantageous in its application to signal seek tuners. In brief, and as will appear more fully hereafter, a vibrating driving means drives through a gripping pawl a movable member which may have a straight line or rotary movement. The amplitude of the vibration and the accompanying step imparted in each cycle to the driven member are both very small. However, quite rapid advance may be secured by increasing the frequency of vibration. A gripping detent prevents retrograde movement of the driven member.

During active operation, the movement of the driven member is intermittent and, consequently, it comes to rest in each cycle of the vibration if the mass of it and its associated parts is reasonably low as may be the case in a signal seek tuner and its movement is opposed, for example, by spring action. Consequently, assuming that the driving vibration may be interrupted within a single cycle, it is capable of being positioned within the limit of a single step of movement.

An advantageous aspect of this motor is that it involves an electromagnetic vibrator having an armature associated with an alternating field with provision for providing either a polarized or non-polarized condition of the armature. The polarization is accomplished by a direct current which does not provide the major driving energy and, hence, may come from a source having a quite low power output such as the direct current supply for a radio. The power input for effecting drive is alternating and the alternating supply may be permanently connected to the driving arrangement without the necessity for switching, there being no vibration occurring when the armature is unpolarized. The control for effecting stopping and starting of the motor being a low power direct current, there is not required any power relay for this control and, as will appear, the control may be quite simply effected.

The objects of the invention are concerned with the provision of a signal seek tuning arrangement particularly adapted to the type of motor just indicated. When the motor is of a linear type, effecting movement of a driven member in a straight line, provision is made for the automatic restoration of the driven member to initial position at the end of its driven movement so as to effect repeated, though interrupted, scanning of a predetermined frequency band of a receiver. These objects will become more apparent from the following description, read in conjunction with the accompanying drawing, in which:

Figure 1 is a diagram illustrating the signal seeking radio receiver incorporating the matters of the invention;

Figure 2 is an enlarged fragmentary sectional view showing details of the gripping pawl and detent arrangements of the driving motor; and Figure 3 is a fragmentary diagram showing the type of motor which may be used for rotary drive of tuning condensers or the like.

The signal seeking tuner in accordance with the invention has, from the standpoint of an operator, very much the same characteristics as signal seeking tuners presently known: i. e., if it is desired to change from reception of one transmitting station to another, there is a momentary operation of a push button or the equivalent whereupon the tuner seeks a new signal, stopping thereon for proper tuning. In accordance with the invention, this general end is accomplished in novel and advantageous fashion as will presently appear.

The receiver may be of any desired type but is indicated as a conventional superheterodyne receiver comprising a radio frequency amplifier 2, a converter 4 which comprises an oscillator and a mixer, an intermediate frequency amplifier 6, a detector 8, an audio frequency amplifier 10 and a speaker 12. It may be assumed that tuning of the receiver is effected through variation of inductors by movement of cores and in Figure 1 the coils of these inductors are indicated at 14, 16 and 18 and the respective movable cores at 20, 22 and 24. The inductors may, respectively, be provided as usual in the radio frequency amplifier, the oscillator and mixer. The cores 20, 22 and 24 are secured to, and movable simultaneously by, a common member 26 which is connected to a rod 28 which may be guided for straight line movement through any suitable mounting means 30.

To provide control for automatic stopping of the tuning on a signal, there is provided a frequency discriminator 32, receiving the output of the intermediate frequency amplifier 6, and which will be recognized as of generally conventional type comprising a pair of circuits tuned to the intermediate frequency of the receiver and providing through diodes 34 and 36 a direct output through the filter 38 which will vary with respect to ground from a substantially negative value through zero to a positive value as tuning passes through the frequency of a received station. The connection 38 runs to the control grid of thyratron 40 the cathode of which is connected to the adjustable contact of potentiometer 42 in a resistance array which, as will appear, is at times connected between a point of positive potential and ground so that the cathode of thyratron 40 is at a positive cut-off potential with respect to the thyratron grid.

At 44 there is indicated a conventional power supply which in the case of automotive use would be of vibrator type receiving power from the automobile battery and supplying high voltage alternating current rectified to provide at terminal 46 the high voltage direct current for the operation of the radio receiver. For the purpose of operating the tuning motor the high voltage alternating current terminals of the power supply are tapped to provide an alternating current output between terminals 48 and 50.

Terminal 52 is connected to the positive supply terminal 46. Associated terminal 54 is connected to the resistance arrangement including the potentiometer 42 and also to a contact terminal 56 of relay 58 the movable contact 60 of which is connected to the terminal 46. One end of the winding of relay 58 is connected to ground through winding 59 of the motor, to which winding reference will be hereafter made. The other end of the winding 58 is connected through a pair of resistances 62 and 64 to the terminal 54 and the junction of these resistances is connected to a terminal 66. A terminal 68 is connected to the anode of thyratron 40. A push button switch 70 is provided which, when released, is spring-held to connect terminals 66 and 68. When manually pressed, the switch opens the connection between terminals 66 and 68 and closes a connection between terminals 52 and 54.

In its preferred form the motor comprises a laminated core 72 which is provided with a gap 74 across which an alternating magnetic field is provided by reason of the location on the core 72 of an alternating current winding 76 the ends of which are connected to the alternating supply terminals 48 and 50. Condenser 78 desirably shunts the winding 76 to provide approximate tuning to the frequency of the alternating supply.

Armature 80 is pivoted at 82 to the core 72 in magnetic contact with the core and projects through the gap 74. The winding 59 previously mentioned surrounds the armature 80.

Springs 84 urge the rod 28 and the cores 20, 22 and 24 in upward direction as viewed in Figures 1 and 2. Lever 86 is pivoted at 88 to the motor assembly frame, which may have any convenient form and is not shown, and is urged downwardly by a spring 90. A pin 92 carried by lever 86 is held by a hook on the lever 94 which is pivoted to the frame at 96 and is provided with an arm 98 extending across the bar 28. A spring 100 normally urges the lever 94 toward a clockwise position to provide retention of the pin 92.

A gripping pawl 102 is provided in the form of a small block and a similar block provides a gripping detent 104. The right-hand end of the pawl 102 is pressed upwardly by leaf spring 106 which is secured to the lever 86. The left-hand end of the pawl 102 has its upper surface engaged by the end of the armature 80.

The upper side of the left-hand end of detent 104 engages pin 108 fixed in the frame while its right-hand end is engaged and urged upwardly by leaf spring 110 secured to the lever 86.

The pawl 102 and detent 104 are, respectively, provided with openings 114 and 116 which have cross-sections corresponding to the rod 28 (which may be circular or rectangular) but are slightly larger to provide clearance for the passage of the rod, and, at the same time, for a tilting and gripping action as will be clear from Figure 2. Consideration of Figure 2 will make clear that if the left-hand end of pawl 102 is moved downwardly by armature 80, a gripping action will occur on the rod 28 so that the rod will be moved downwardly, the gripping action being insured by the action of the leaf spring 106 at the right-hand end of the pawl. During such downward movement, the detent 104 will be rocked slightly clockwise whereupon a slight clearance is provided to permit the downward movement of the rod. At the end of such enforced downward movement the rod will tend to move upwardly under the action of springs 84. Such movement is prevented, however, by the detent 104 which is backed up by the pin 108 and held in position to effect gripping by the leaf spring 110. As the end of the armature 80 moves upwardly, the pawl 102 may follow it under the action of leaf spring 106 and, consequently, the pawl 102 moves upwardly relative to the rod 28 to assume a new position for gripping it to drive it subsequently downwardly.

Continuing the description of the parts, the lever 86 is provided with projections 118 and 120 which are in position to engage the right-hand ends of pawl 102 and detent 104 when the lever 86 is released. Downward movement of the lever 86 is limited by the fixed pin 122 which pin, together with a second fixed pin 124, serves to provide guidance for the rod 28 in addition to such guidance as may be afforded at 30.

Pin 126 is carried by the upper end of the rod 128 and is arranged to engage the extension 98 of lever 94 at the end of travel of the rod 28. Pin 128 carried by the rod is arranged to engage the left-hand lower end of the lever 86 when the rod 28 moves upwardly.

A contact 129 is arranged to be engaged by lever 86, which is electrically grounded, when lever 86 is released by latch 94. Contact 129 is connected through line 131 to the input of the I. F. amplifier 6 which is accordingly grounded when the lever 86 is released to interrupt signals through the receiver and in particular to interrupt signals to the discriminator.

The parts having been described, the overall operation of the system may now be outlined.

Assuming that the radio has been tuned to a station, there will be provided at connection 38 a positive potential, the discriminator circuit being so tuned that the change from a negative to positive potential at this connection occurs at a frequency slightly below the center of the intermediate frequency band pass. The contacts at 56 and 60 will be open and the push button switch 70 will occupy the left-hand position illustrated with the result that there is no anode potential applied to the thyratron 40 and, furthermore, no current flows through the winding 59. Accordingly, the armature 80 is unpolarized and it is, therefore, unmoved by the alternating field across the gap 74 provided by the winding 76 which is permanently connected to the alternating supply terminals 48 and 50. The rod 28 is held against the action of springs 84 by detent 104 and latching lever 94 engages pin 92 to hold lever 86 in the position illustrated. The tuning condition effected by the cores 20, 22 and 24 is thus maintained.

If it is desired to tune the receiver to another station, the push button switch 70 is manually pressed to the right-hand position illustrated and then released. Depression of this switch disconnects the terminals 66 and 68 and connects the terminals 52 and 54. The connection of terminals 52 and 54 provides a positive potential to the right-hand end of resistance 64 and, consequently, provides direct current flow through the relay winding 58 and the motor winding 59. The energization of the relay closes the contacts 56 and 60 and the circuit therethrough provides the positive potential to the terminal 54 despite the opening of the connection between 52 and 54. When the switch 70 is released, connection is provided between terminals 66 and 68 so that there is applied to the anode of the thyratron 40 the positive potential existing at the junction of resistances 62 and 64. Even if the push button 70 is pressed and almost immediately released, movement of the rod 28 will have been initiated to tune the receiver off the signal frequency and, consequently, the potential at 38 will have dropped to a non-firing potential considering the fact that, though a positive potential is applied to the anode of the thyratron, its cathode also has a positive potential due to its connection to the potentiometer 42 and the positive potential existing between terminal 54 and ground applied to the resistance array including the potentiometer. The thyratron, accordingly, remains in unfired condition following release of the push button switch.

The direct current flow through winding 59 provides polarization of the armature 80 which, consequently, vibrates giving rise to the driving action on the rod 28 above outlined, the driving occurring through the pawl 102 and reverse movements being prevented by the action of detent 104. Because of the low inertia of the parts including and connected with the rod 28, and the presence of springs 84, there is a cessation of movement of the rod 28 in each cycle of vibration of the armature 80. The movement imparted to the rod 28 in each cycle may be of the order of a thousandth of an inch. The frequency of vibration, however, is such that average movement of the rod 28 is reasonably fast. By control of the currents flowing, both direct and alternating, initial adjustments of the average rate of movement may be readily made to suit desired operating conditions.

It may be here noted that when the direct current polarization of the armature is removed the alternating current flow through the coil 76 is very substantially reduced thus lowering the drain on the power supply and preventing overheating.

The intermittent movement of the rod 28 downwardly then continues until tuning to another signal of sufficient strength to effect control is approached. The incoming signal first produces a negative potential at 38. As precise tuning is approached, this potential passes through zero and becomes positive. The rate of change of this potential with the incoming frequency depends upon the amplitude of the signal and the parameters of the discriminator circuit are desirably chosen or adjusted so that the potential at 38 becomes sufficiently positive to fire the thyratron 40 just as the tuning of the receiver reaches the frequency of an incoming signal. It may be here noted that by adjustment of the contact of potentiometer 42 selection may be afforded between signals which are relatively strong and relatively weak so that the operator may set the sensitivity either to pick up any weak signals or to pick up only relatively strong signals as may be received from, for example, local transmitting stations. When the potential at 38 reaches a firing potential, firing of the thyratron 40 occurs with the result that its anode potential drops close to its cathode potential providing a corresponding drop of potential at the junction of resistances 62 and 64 to cause the current through the relay 58 to be insufficient to maintain closed the contacts 56 and 60. Accordingly, these open with the result that the supply potential is removed from terminal 54, removing the anode potential of the thyratron and eliminating current flow through relay 58 and winding 59. The armature 80 is, accordingly, unpolarized and, consequently, its vibratory movements stop, leaving the rod 28 in the attained position corresponding to tuning to the signals of another transmitter. In fact, the interruption of vibration of armature 80 is not dependent upon the opening of the relay contacts, the drop of potential at the junction of resistances 62 and 64 upon firing of the thyratron reducing the polarization of the armature to such extent that its vibratory amplitude is so small that little or no movement is imparted to rod 28. Therefore, even if the opening of contacts 56 and 60 is delayed, the motion of 28 is very sharply arrested, within the period of one cycle of the alternating supply. Extremely accurate positioning for tuning is thus assured. With the circuit described stopping on signal is accurately effected irrespective of large variations of signal strength so long as the adjustment at potentiometer 42 is such as to effect stopping on the weakest signals to be detected.

The foregoing operations may be repeated to secure tuning across the entire frequency band of the receiver. As the end of the tuning range is reached, the pin 126 engages the extension 98 of lever 94, releasing the pin 92 so that the lever 86 is rocked counterclockwise against stop 122 by spring 90. The projections 118 and 120 then press downwardly the right-hand ends of pawl 102 and detent 104 from which springs 106 and 110 have been removed by the movement of lever 86 and the rod 28 is thus freed to be moved upwardly by the springs 84. The upward movement occurs quickly and at its upper limit the pin 128 engages the lower left-hand end of lever 86, snapping this lever upwardly against the action of spring 90 to lift the pin 92 above the hook end of lever 94 by which it will be engaged and thereafter held since the extension 98 will previously have been released by pin 126. The actions of the pawl and detent are thus reinstated and if at the end of this movement a received signal has not been tuned, the automatic tuning action will continue until tuning of an incoming signal is achieved as previously described.

When the lever 86 is rocked by spring 90 upon release of detent 94, contact 129 is grounded and signals through the receiver to the discriminator are interrupted until the contact at 129 is reopened by the rocking of lever 86 by pin 128. Thus a complete return of the rod 28 is insured before the discriminator action may again become effective. This also prevents noise output from the speaker as the set is reversely tuned through stations.

From the foregoing it will be seen that there is provided in accordance with the invention a sharp tuning action involving control of only very low power and without the necessity for providing brakes to prevent overrun of the tuning elements.

The invention is also applicable to the signal seek tuning of a receiver of a type involving rotary adjustments of ganged condensers or other devices such as may be used in ultra high frequency receivers. Direct rotary operation may be secured without the necessity for involvement of gearing or other means for transforming a linear motion to a rotary one. The type of motor arrangement for this purpose is illustrated in Figure 3 wherein 130 indicates a rotary member which may drive directly the movable plates of tuning condensers in a radio or television receiver, or the like, or rotary elements involved in line tuners, or the like, for ultra high frequency use. The rotary member 130 is provided with a rim 132 which may be of rectangular cross-section and there is provided a driving pawl 134 corresponding to 102 previously described but taking the form of a slotted member embracing the rim with a slight clearance. The pawl is engageable by the projection 138 of armature 140 pivoted at 142 and located between the poles 144 and 146 of a laminated core which is also provided with a central portion 148 closely approaching the armature 140. An alternating current winding 150 is provided on the outer legs of the core while the central portion thereof is provided with a direct current winding 152.

Detent 156, similar in structure to the pawl 134, embraces the rim 132 and engages a fixed pin 158. Springs 154 and 160 engage, respectively, the pawl 134 and detent 156 and correspond to the springs 106 and 110 previously described. Assuming a 360° rotary movement, there is no necessity for providing releasing means such as the lever 86 previously described. It will be evident that the arrangement illustrated in Figure 3 operates in the same fashion as that illustrated in Figure 1, vibration of the armature occurring only when the direct current coil 152 is energized despite the fact that the alternating current coil may be continuously energized.

It may be here noted that various winding arrangements and physical arrangements of the vibrating driving means may be provided. For example, the alternating and direct current windings may be interchanged in both Figures 1 and 3.

It will be clear that numerous variations may be made in the specific embodiments of the invention without departing from the scope thereof as defined in the following claims.

What is claimed is:

1. A radio receiver of signal seek type comprising variable signal tuning means, a motor for driving said tuning means, said motor comprising a field member providing a gap, a vibratory member having a portion located in said gap, a winding for said field member, a winding for said vibratory member, means providing alternating current through one of said windings and direct current through the other, a movable driven member connected to said variable tuning means to adjust the latter, frictional gripping means movable by vibration of said vibrating member to advance said driven member, detent means preventing backward movement of said driven member, and means for interrupting said direct current when said tuning means attains positions tuning received signals.

2. A radio receiver of signal seek type comprising variable signal tuning means, a motor for driving said tuning means, said motor comprising a field member providing a gap, a vibratory member having a portion located in said gap, a winding for said field member, a winding for said vibratory member, means providing alternating current through one of said windings and direct current through the other, a movable driven member connected to said variable tuning means to adjust the latter, frictional gripping means movable by vibration of said vibratory member to advance said driven member, detent means preventing backward movement of said driven member, means for interrupting said direct current when said tuning means attains positions tuning received signals, spring means urging said driven member backwardly towards an initial position, means operated by said driven member upon its attainment of a predetermined forward position to release it from said gripping means and said detent means for backward movement to said initial position under the action of said spring means, and means effecting reengagement of said driven member by said gripping means and said detent upon the attainment by said driven member of its initial position, thereby to effect resumption of its advance.

References Cited in the file of this patent
UNITED STATES PATENTS

| | | |
|---|---|---|
| 825,877 | Boucherot | July 10, 1906 |
| 2,056,200 | Lowell | Oct. 6, 1936 |
| 2,323,441 | Baird | July 6, 1943 |
| 2,499,573 | Dunn | Mar. 7, 1950 |
| 2,511,580 | Goodrich | June 13, 1950 |
| 2,565,876 | Nicholson | Aug. 28, 1951 |
| 2,606,222 | Clifford | Aug. 5, 1952 |